United States Patent [19]

Shoemaker

[11] Patent Number: 4,968,147

[45] Date of Patent: Nov. 6, 1990

[54] LASER TARGET PIPE INSERT APPARATUS

[76] Inventor: Jack W. Shoemaker, 9430 Woodsboro Pike, Walkersville, Md. 21793

[21] Appl. No.: 401,885

[22] Filed: Sep. 1, 1989

[51] Int. Cl.$^5$ .................... G01B 11/00; G01B 11/26; G01C 15/02

[52] U.S. Cl. .................................. 356/399; 356/153; 33/293

[58] Field of Search .................. 356/399–401, 356/138, 153, 154, 148; 33/286, 290, 291, 293, 292, 296, 529, DIG. 21

[56] References Cited

U.S. PATENT DOCUMENTS

| | | | |
|---|---|---|---|
| 3,612,700 | 10/1971 | Nelson | 356/153 |
| 3,631,601 | 1/1972 | McNulty | 356/153 |
| 3,801,205 | 4/1974 | Eggenswyler | 356/172 |
| 3,815,250 | 6/1974 | Roodvoets et al. | 33/286 |
| 3,898,743 | 8/1975 | Myeress | 33/293 |
| 4,053,238 | 10/1977 | George et al. | 356/249 |
| 4,272,191 | 6/1981 | Bergkvist | 356/153 |
| 4,447,962 | 5/1984 | Grosberg | 33/286 |
| 4,549,360 | 10/1985 | Allen | 33/293 |
| 4,709,485 | 12/1987 | Bowman | 33/228 |

Primary Examiner—Richard A. Rosenberger
Assistant Examiner—Hoa Q. Pham
Attorney, Agent, or Firm—Henderson & Sturm

[57] ABSTRACT

A base target apparatus for aligning a length of pipe (100) along the longitudinal axis of a pipe string wherein the target apparatus (10) includes a base unit (11) containing a target unit (13) and having one tapered end (15) which is dimensioned to be received in the bell end (101) of the pipe whereas, the other end (15') of the base unit (11) is provided with an anchor unit (12) which is dimensioned to be frictionally engaged in the spigot end (102) of the length of pipe (100).

7 Claims, 1 Drawing Sheet

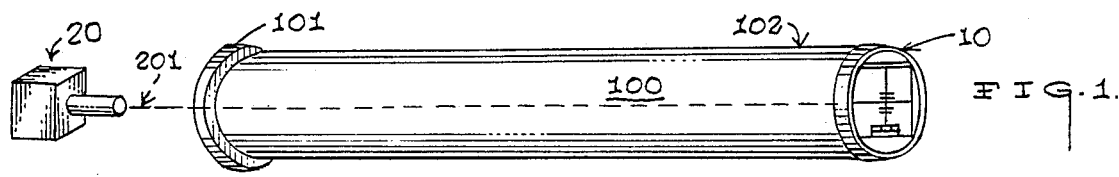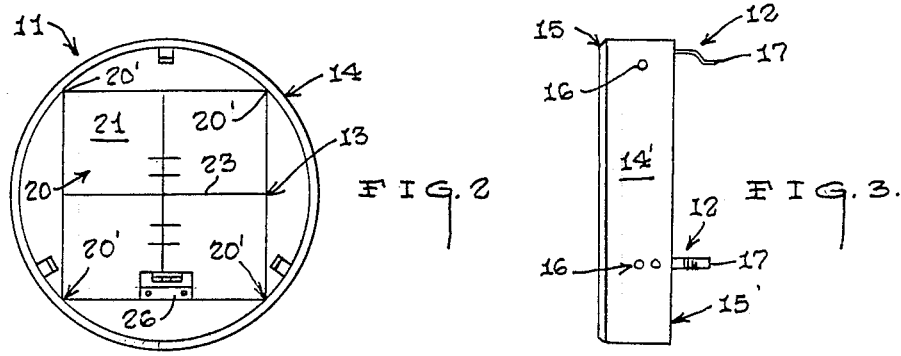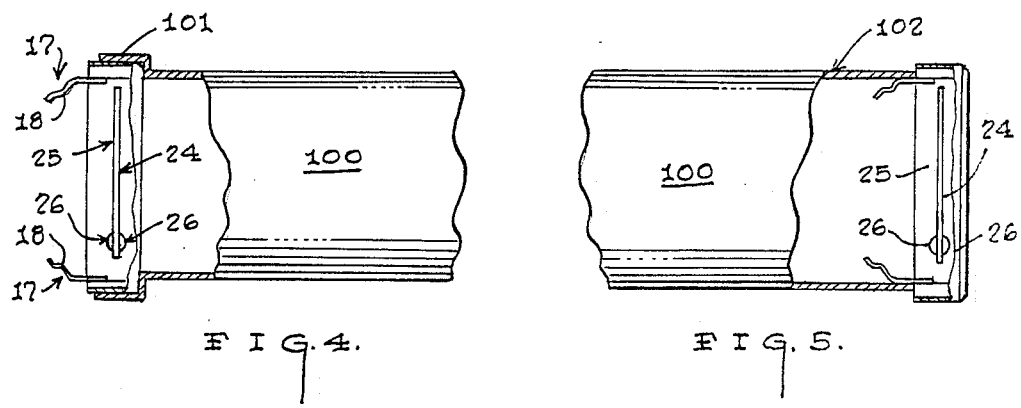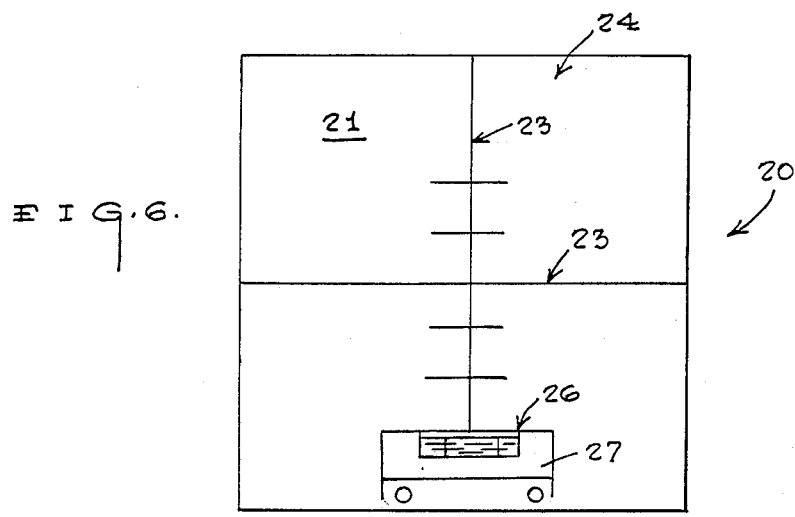

LASER TARGET PIPE INSERT APPARATUS

TECHNICAL FIELD

This invention relates generally to a target device for lasers, and in particular to a laser target apparatus adapted to be inserted into the end of a pipe and used for the alignment thereof.

BACKGROUND ART

As can be seen by reference to the following U.S. Pat. Nos. 4,549,360; 4,447,962; 4,709,485; 4,272,191; 3,815,250; 3,801,205; 3,612,700; and 4,053,238, the prior art is replete with myriad and diverse laser target systems for pipes.

While the prior art constructions are more than adequate for the purpose and function for which they were specifically designed, they do suffer from a number of shared deficiencies.

For instance, the prior art constructions are, oddly enough, much too complex for the relatively simple task involved. The primary function to be served by this type of system is actually quite simple, yet the prior art approaches the problem through the use of multi-component, rather complex, constructions. This unnecessarily increases the costs for both manufacturer and the end users of the prior art constructions.

In addition, another common deficiency in the prior art devices involves their inability to be used with small diameter pipes. While most of the prior art constructions are not excessively large, it is quite evident after studying these constructions that the majority of them are not deployable in the smaller diameter pipes, such as the conventional six inch diameter pipes which enjoy widespread usage. This particular shortcoming introduces drastic limitations on the general usefulness of the prior art constructions, since they are not suited for universal applications.

Obviously, there has been a longstanding need for a laser target device for pipes which incorporates the features of simplicity and adaptability. The development of such a device is the stated purpose and objective of the present invention.

DISCLOSURE OF THE INVENTION

The laser target apparatus that forms the basis of the present invention comprises, in general, a target unit, a cylindrical base unit, and an anchoring unit. The cylindrical base unit comprises in general, a narrow section of a tubing having approximately the same diameter as the section in which the laser target apparatus will be employed.

The anchor unit comprises a series of leg members disposed around the interior surface of the base unit and dimensioned to facilitate frictional engagement between the leg members and the spigot end of a pipe, wherein the interior diameter of the base unit and the associated pipe are the same.

The leg members of the anchor unit are disposed at one open end of the cylindrical base unit, while the other end is free and slightly tapered. The tapered end is generally dimensioned to be engaged in the bell end of a pipe. Thus, the target apparatus may be placed at either the spigot end of a pipe through use of the anchor unit or the bell end by the frictional engagement of the tapered cylindrical base.

The target unit comprises a square plate member centrally disposed relative to the interior of the cylindrical base unit, wherein the four corners of the plate member are operatively secured with the internal periphery of the base unit. The plate member is generally formed of a dielectric material having sufficient transparency to allow the point at which a laser beam strikes the plate member to be visible from the opposite side of the plate. However, the plate member must also be of sufficient opacity to prohibit or significantly inhibit propagation of the beam beyond the plate.

In addition, the plate member is further provided with a series of crosshatch marks which indicate the center of the target, as well as at least one element level to assist in identifying alignment errors.

The laser target of the present invention is utilized to precisely align a pipe through use of a laser beam impinging on the laser target. In general, a laser will be situated at one end of a length of pipe. The laser will emit a beam which will travel through the pipe, and strike the target unit of the apparatus. The pipe is then adjusted until the beam strikes the laser target's center, and proper alignment is achieved.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the present invention shown in its intended environment;

FIG. 2 is an end plan view;

FIG. 3 is a side plan view;

FIG. 4 is a cross-sectional view of the apparatus deployed in the bell end of a pipe;

FIG. 5 is a cross-sectional view of the apparatus deployed in the spigot end of a pipe; and FIG. 6 is a front plan view of the target unit of the laser target apparatus.

BEST MODE FOR CARRYING OUT THE INVENTION

Referring now to the drawings, wherein like reference numerals designate identical or corresponding parts throughout the several views, FIGS. 1 through 3 show the laser target apparatus of this invention designated by the reference numeral (10). The apparatus (10) comprises, in general, a cylindrical base unit (11), an anchoring unit (12), and a target unit (13). These units will now be described in seriatim fashion.

As can be seen by reference to FIGS. 2 and 3, the cylindrical base unit (11) comprises a generally narrow pipe section (14') wherein the schedule size of the section (14') closely corresponds to the schedule size of the length of the pipe (100) which is desired to be aligned. In addition, one end (15) of the cylindrical base unit (11) has conically tapered portions to facilitate the insertion of the base unit (11) into the bell end (101) of the pipe (100), while the other end (15') is cut flush to abut against the spigot end (102) of the pipe (100).

The base unit (11) is further provided with a plurality of target mounting apertures (16) which are disposed around the outer periphery and extend through the thickness of the pipe (100). Specifically, four equally spaced target mounting apertures (16) will be provided around the periphery of the base unit (11). The purpose and function of these target mounting apertures will be discussed in additional detail further on in the specification.

As can best be seen by reference to FIGS. 2 through 5, the anchoring unit (12) comprises in general, a plurality of base securing arms (17) wherein, the base securing arms (17) are operatively attached to the interior wall of the base unit and are dimensioned to project outwardly beyond the flush cut end (15') of the base unit (11). The securing arms (17) are further contoured and dimensioned to frictionally engage the spigot end (102) of a pipe (100) as shown in FIG. 5.

In the preferred embodiment depicted in the drawings, the anchoring unit (12) includes three equally spaced base securing arms (17), where each of the base securing arms (17) comprises a contoured clip element (18) which extend into and frictionally engage the base unit (11) within the spigot end (102) of the pipe (100).

Referring now to FIGS. 2 and 6, the target unit (13) of the laser target apparatus (10) comprises a general thin, flat, rectangular target member (20) formed of a partially transparent dielectric material (21), wherein the target member (20) is dimensioned to be deployed within the interior of the base unit (11) and having the four corners (20') of the target member (20) to be engaged in the target mounting apertures (16) of the base unit (11).

The target member (20) is further provided with indicia in the form of horizontal and vertical lines (23) engraved and/or painted on the front (24) and rear (25) faces of the target member (20), wherein the major horizontal and vertical lines (23) intersect proximate the center of the target member (20), as well as at points directly above and below the center.

Referring now to FIGS. 4 and 5, it can be appreciated that the target unit (13) also includes a pair of level members (26) wherein, each level member (26) comprises a standard air bubble type level indicating device (27) operably attached to a lower center position of the faces (24, 25) of the plate member (20).

At this juncture, it should be apparent that the laser target apparatus (10) of the present invention is equally suited for use in either the bell (101) or spigot (102) end of a pipe to align the pipe with other pieces of pipe. This alignment is accomplished in conjunction with a laser device (20) capable of generating a laser beam (201) along the longitudinal axis of the desired alignment of the pipe string.

Once the laser beam (201) is registered at the desired vertical height and horizontal angle, the target apparatus (10) is inserted into a selected (101, 102) end of a pipe (100) and the exposed level (26) is used to insure that the target (20) is properly seated in the pipe end (101, 102).

Then when the laser beam (201) impinges on the dielectric plate (21) an observer can readily detect how close the laser beam (201) is coming to the center of the target (20) and the pipe (100) can be adjusted accordingly so that the laser beam (201) is in alignment both with the center of the target (20) and the longitudinal axis of the pipe (100).

Having thereby described the subject matter of this invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. A laser target apparatus for use in combination with a laser beam generating device to align a length of pipe in a pipe string wherein each pipe has a bell end and a spigot end, and wherein the apparatus comprises:
   a cylindrical base unit including a narrow pipe section having a schedule size which corresponds to the schedule size of said length of pipe which is to be aligned and wherein one end of said pipe section is cut flush and dimensioned to abut against the spigot end of said length of pipe, and further provided with securing means which engage the interior of the spigot end of said length of pipe and the other end of said pipe section has a tapered portion so that the said other end can be received in the bell end of said length of pipe;
   and a target unit operatively secured to the interior of said pipe section wherein said target unit comprises a target member having indicia formed on both the front and rear faces of the target member.

2. The apparatus as in claim 1 wherein said target member is fabricated from partially transparent dielectric material.

3. The apparatus as in claim 2 wherein the target member is further provided with at least one level member on one of the faces of the target member.

4. The apparatus as in claim 3 wherein the indicia comprises a series of horizontal and vertical lines.

5. The apparatus as in claim 1 further comprising:
   an anchor unit associated with flush cut end of the base unit wherein the anchor unit comprises a plurality of securing arms which are contoured and dimensioned to be frictionally received in the spigot end of said length of pipe.

6. The apparatus as in claim 1 wherein the target unit further comprises a generally thin, flat, rectangular target member.

7. The apparatus as in claim 6 wherein the base unit further comprises a plurality of mounting apertures which are spaced around the periphery of the base unit and which are dimensioned to engage the four corners of the said generally flat rectangular target member.

* * * * *